(12) United States Patent
Corley

(10) Patent No.: US 6,987,533 B2
(45) Date of Patent: Jan. 17, 2006

(54) CAMERA REFERENCE DEVICE AND METHOD OF MAKING CAMERA REFERENCE DEVICE

(76) Inventor: Ferrand David Ernest Corley, 80 Kleine Crescent, Kleinburg Ontario (CA) L0J 1C0

( * ) Notice: Subject to any disclaimer, the term of this patent is extended or adjusted under 35 U.S.C. 154(b) by 790 days.

(21) Appl. No.: 09/983,962

(22) Filed: Oct. 26, 2001

(65) Prior Publication Data

US 2004/0201725 A1    Oct. 14, 2004

(51) Int. Cl.
*H04N 9/73* (2006.01)
*H04N 17/00* (2006.01)

(52) U.S. Cl. .................. 348/223.1; 348/188; 348/375; 101/171; 434/81

(58) Field of Classification Search ............. 348/223.1, 348/188, 375, 125, 128, 222.1; 434/81, 98; 101/171; 347/105
See application file for complete search history.

(56) References Cited

U.S. PATENT DOCUMENTS

| | | | |
|---|---|---|---|
| 4,991,007 A * | 2/1991 | Corley | 348/188 |
| 5,668,596 A * | 9/1997 | Vogel | 348/222.1 |
| 6,324,975 B1 * | 12/2001 | Kondo | 101/171 |
| 2002/0122589 A1 * | 9/2002 | Reiman et al. | 382/167 |

* cited by examiner

Primary Examiner—David L. Ometz
Assistant Examiner—Lin Ye
(74) Attorney, Agent, or Firm—Dowell & Dowell P.C.

(57) ABSTRACT

A reference device for setting color biasing mechanisms on a camera and achieving a consistent color biasing in different environmental situations, and a method of making the same. The reference device comprises a reflective media having a surface that has had its spectral characteristics analyzed and its surface treated with colored droplets, wherein each of the droplets is less than 5 picoliters in volume, to achieve a degree of desired white neutrality or color bias of different spectral quality than that which was analyzed as aforesaid. A method for producing a standardized white or color-biased surface on reflective media for use with a camera with color balance setting mechanisms includes selecting a media with a surface that is suitable for modification to colorimetrically neutral reference surface, analysing the spectral characteristics of the reference surface, and treating the surface of the media with colored droplets, with each of the droplets being less than 5 picoliters in volume to achieve the degree of desired white neutrality or color bias.

8 Claims, 4 Drawing Sheets

CAMERA REFERENCE DEVICE AND METHOD OF MAKING CAMERA REFERENCE DEVICE

This invention relates to providing a reference device and a method for making a reference device for setting the colour quality on cameras.

BACKGROUND OF THE INVENTION

Field of the Invention

Presently, electronic cameras, whether still or motion, have balance settings for setting colour quality. In the better cameras, the balance setting, which is commonly referred to as a white balance setting, can be adjusted manually. The camera user adjusts the setting by directing the lens at a white surface and changing the setting in accordance with the characteristics of the white surface.

The problem with the prior art is that there has not been any readily available standardized reference device which can easily be transported and which can be used by camera operators for accurately setting the colour balance in different locations. The practice has been to use whatever object is near the user, and this means that objects such as sheets of white paper, a colleague's shirt, a white vehicle or whatever other imprecisely-colored object at hand is often used. The problem with choosing reference objects on the basis of what is at hand is that the colour quality of those objects differs vastly and, the colour quality of the resulting work can be inconsistent and less than optimum.

In the case of laboratory spectrophotometry, barium sulphate and magnesium oxide are often used as standard reference whites, but they are expensive, easily damaged and impractical for use in a television or film production environment.

An object of the present invention is to provide a method of making a reference device and a reference device with a specified colour biased surface for accurately and consistently setting the colour balance of a camera to that specific colour bias.

Another object of the present invention is to provide a reference device and a method of making a reference device with a neutral white surface for accurately and consistently setting the white balance of a camera.

Another object of the present invention is to provide a reference device and a method of making a reference device with a colour biased surface of particular quality.

SUMMARY OF INVENTION

According to an aspect of the present invention there is provided: a method of producing a standardized white or colour-biased surface on reflective media for use with a camera with colour balance setting mechanisms, comprising: I) selecting a media with a surface that is suitable for modification to calorimetrically neutral reference surface; ii) analysing the spectral characteristics of the reference surface; treating the surface of the media with coloured droplets, with each of said droplets being less than 5 picoliters in volume to achieve the degree of desired white neutrality or colour bias.

According to another aspect of the present invention there is provided a reference device for setting the colour biasing mechanisms on a camera and achieving a consistent colour biasing in different environmental situations, comprising: a reflective media having a surface that has had its spectral characteristics analysed and its surface treated with coloured droplets, wherein each of said droplets is less than 5 picoliters in volume, to achieve a degree of desired white neutrality or colour bias of different spectral quality than that which was analyzed as aforesaid.

BRIEF DESCRIPTION OF THE DRAWINGS

The invention will be more readily understood after reference to the following drawings read in combination with the description provided hereafter wherein.

DETAILED DESCRIPTION OF THE DRAWINGS

Figure 1:
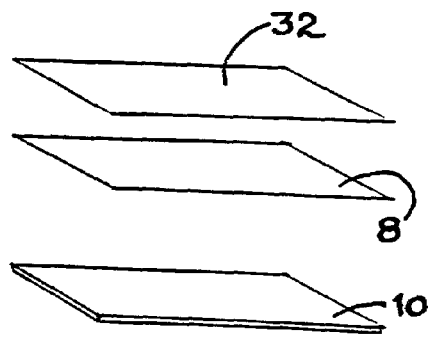
FIG. 1 is an illustration of the components of an uncorrected white reference device.
Figure 2:
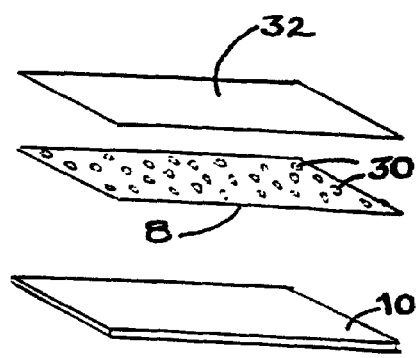
FIG. 2 is an illustration of the components of a corrected white reference device.
Figure 4:
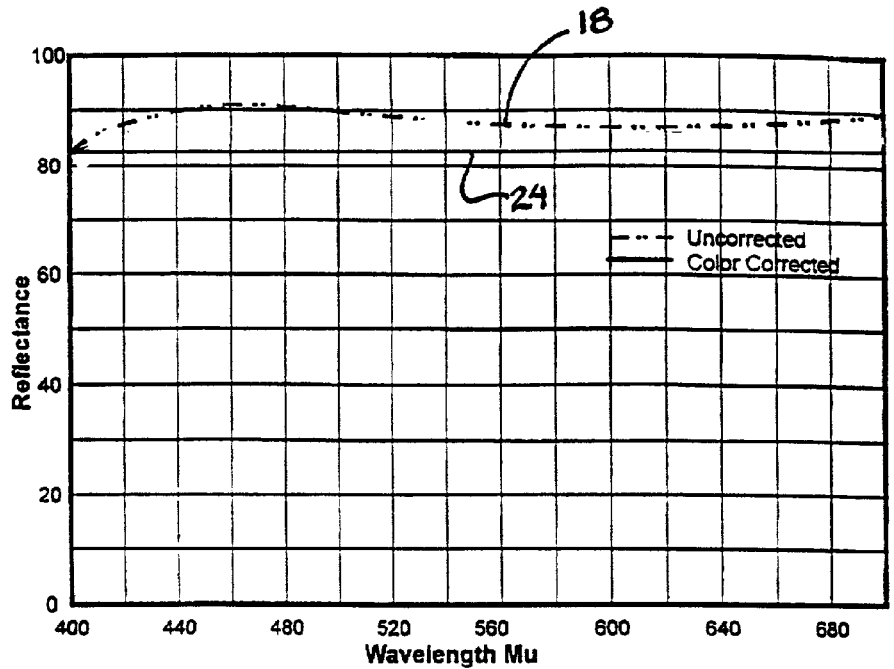
FIG. 4 is a graphical representation of the spectrophotometric curves of an uncorrected white reference surface on a body and a corrected white reference surface on a body.

Referring to FIGS. 1 and 2, there is shown the components of the preferred embodiment of the reference device. The reference device is usually a neutral white reference device as opposed to a colour-biased device because most balance setting devices on cameras are white-balance settings. It is therefore in respect of a white balance setting that the example of FIGS. 1, 2 and 4 are herein being provided. However, it will be apparent to those skilled in the art that colour biasing qualities both in the method and the reference device that are not neutral white may also be obtained by the invention disclosed herein.

Referring to FIGS. 1 and 2, a sheet 8 is chosen and where necessary, i.e. it does not have enough rigidity or opaqueness applied to the backing board 10. The resulting combination of the sheet 8 and the backing board 10, after the colour adjustment described below, should be that the exposed surface 12 is opaque enough that there is no transparency effect, but also that there is substantial reflectiveness so that sufficient light is reflected to provide a reference device for setting white neutrality or colour bias.

In the cas where the reference device is to be used for white colour biasing, a base sheet 8 is chosen as close to pure white as possible. A sheet 8 is chosen that is thought to be of minimal colour tint. Generally, it is very difficult to make this discernment using the naked eye and colour analyzing equipment, such as a spectrophometer or calorimeter can be used to identify the base sheet 8 that would most provide the easiest obtainable best result. The closer the base sheet 8 is to neutral white, the easier the optimum result will be obtainable because less adjustment will be required.

When comparing the neutral white qualities of two white base sheets, the white base sheet of lesser neutral white quality may still be used, but it will require more modification in the inking/dyeing process described below.

As will be apparent to those skilled in the art, the base sheet 8 to be applied to the backing board 10 need not be simply a sheet of paper. It can be anything that supports colour, including paper, plastic or paint on a substrate. In choosing a medium having neutral white colouring, the best results of this invention are achieved, if the medium is as reflective as possible, typically between 80 and 90 percent in the range betweeen 400 Mu to 700 Mu (i.e. the visible spectrum). As the process disclosed herein for adjusting the colour proceeds, the overall reflection will most likely be reduced because of the colouring adjustment. So it is that the inventor has found it advantageous to start off with a medium of higher reflectivity as opposed to that of lower reflectivity.

Another quality sought for the medium used for the base sheet 8 is that it be of a quality to accept the colouring medium (such as ink, dye or pigment) being used to moderate the reflection at the required wavelengths of light to achieve the desired white neutrality or colour bias.

Once the suitable base sheet material 8 has been selected and attached to the backing board 10, it is analyzed by a colour-sensing mechanism capable of analyzing the degree of reflectivity over the visible spectrum for wavelengths. In the preferred embodiment, the inventor has found the use of a spectrophotometer to effectively achieve the objects of this invention.

Figure 3:
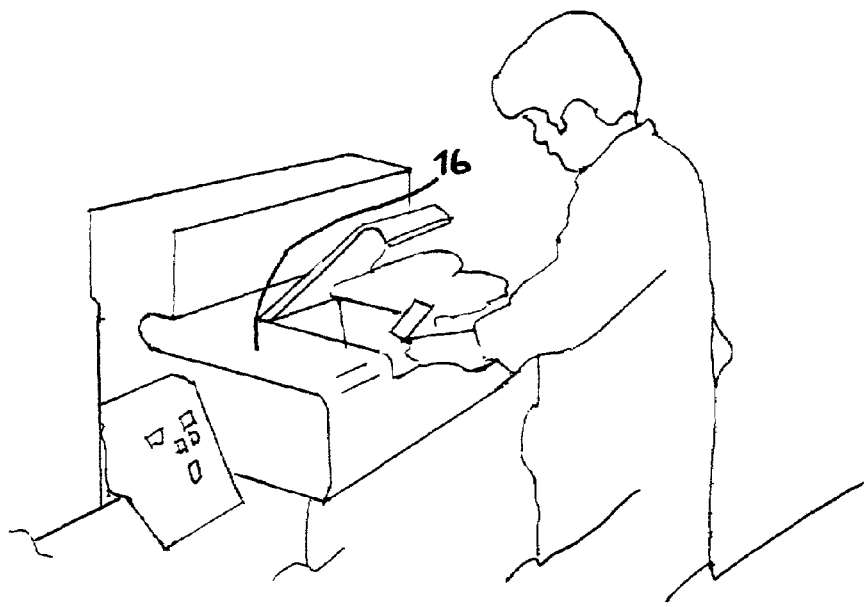
FIG. 3 is an illustration of the placing of a reference media in a colorimetrical analyzing device, namely a spectrophotometer.
Figure 5:
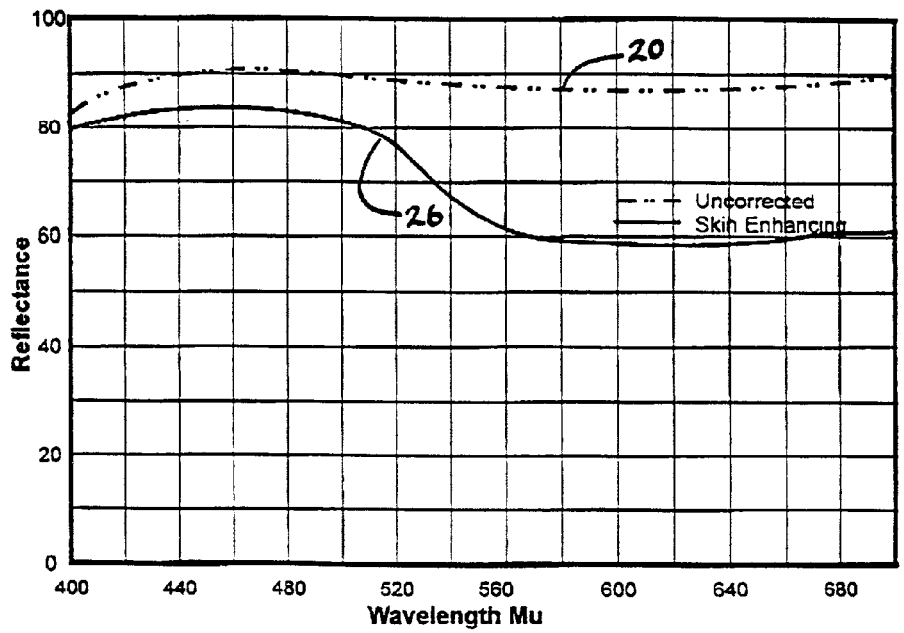
FIG. 5 is a graphical representation of the spectrophotometric curves of an uncorrected white reference surface on a body and a white reference surface on a body to which has been applied a standardized degree of blue/green biasing.

A spectrophotometer 16 is illustrated in FIG. 3 and its operation is known to those skilled in the art. A spectrophotometer 16 is an instrument that measures the transmission or reflectance of light as a function of wavelength. The resulting measurements can be graphically produced as illustrated in FIG. 4 and FIG. 5. A typical spectrophotometer can read ultraviolet levels from 300 Mu up through infrared at 800 Mu or higher. However in respect of the present invention, one is primarily interested in the visible part of the spectrum, namely between 400 Mu and 700 Mu. A spectrophotometer or colour-sensing mechanism that can provide readings of reflectivity at these wavelengths will suffice to achieve the results of this invention.

In use, a reflection reading of the base sheet 8 attached to the backing sheet 10 using a spectrophotometer that has been accurately calibrated to a correct source. In the case of neutral white, this would be barium sulphate. This calibration provides the spectrophotometer with the necessary reference data to provide accurate test results. For instance, in the case of neutral white, the aim is to obtain neutrality across the visible spectrum as illustrated by curve 18 in the graph shown in FIG. 4. In the case where a colour bias is desired, the aim would be to obtain a varying degree of reflectivity across the visible spectrum such as that illustrated by curve 20 in the graph shown in FIG. 5. In both cases, the aim is to modify the exposed surface 12 of the base sheet 8 so that the degree of reflectivity is changed from that of the curves 24 and 26, shown in the graphs of FIG. 4 and FIG. 5 respectively, to that as shown in the curves 18 and 20. Once the degree of reflectivity is known for both the reference curve and the curve of data produced by analysing the exposed surface 12 of the base sheet 10, the necessary modification can be made.

The adjustment can be made by using standard off-the-shelf graphic software such as Corel Draw or Adobe Illustrator, mentioned here only as examples.

For instance, to produce a true white reference from the sample as analyzed in FIG. 4, a person skilled in the art would appreciate that the curve of the basic white reference graph has higher reflectance levels ath the blue and red ends of the visible spectrum, and that the curve produced by the base sheet 8 can be corrected by applying yellow and cyan colour. For instance when printing from Corel Draw, using a 4 colour printer, such correction would typically require, C, M, Y, K settings of Cyan 2, Magenta 0, Yellow 3 and Black 0. The settings required for the achievement of co-linearity of the readings will be apparent to those skilled in the art, although there will be some trial and error involved in the printing process.

Similarly, to produce a colour biased reference such as that shown in FIG. 5 to achieve enhanced skin tones, the sought-after reference curve would more appropriately be that as shown as 20 in FIG. 5 as opposed to 18 in FIG. 4. Modifying the qualities of the base sheet 8 in the case illustrated would typically require, when printed from Corel Draw using a 4 colour printer settings of Cyan 3, Magenta 6, Yellow 0 and Black 0.

It is essential to this invention that the printed droplets of coloured medium be sufficiently small so as to achieve the fine modification required. The inventor has found that the droplets must be below 5 picoliters in volume to achieve consistent results.

It will also be apparent to those skilled in the art that the printing process required to modify the colour must take into consideration the effect of the lamination sheet 32 if laminated and as well, the effect of the backing sheet on the opaqueness of the base sheet 8. It is preferable that the base sheet 8 be laminated after adjustment so that the resulting device has weatherability. The effect of the lamination on the reflectivity is predictable, however, and easily accounted for in the process. This will be apparent to those skilled in the art.

After printing process, colour dots 30 (shown not-to-scale for illustrative purposes only) are added to the base sheet 8 and it is placed on the backing sheet 10 and laminated in the conventional manners known to those skilled in the art.

Figure 6:
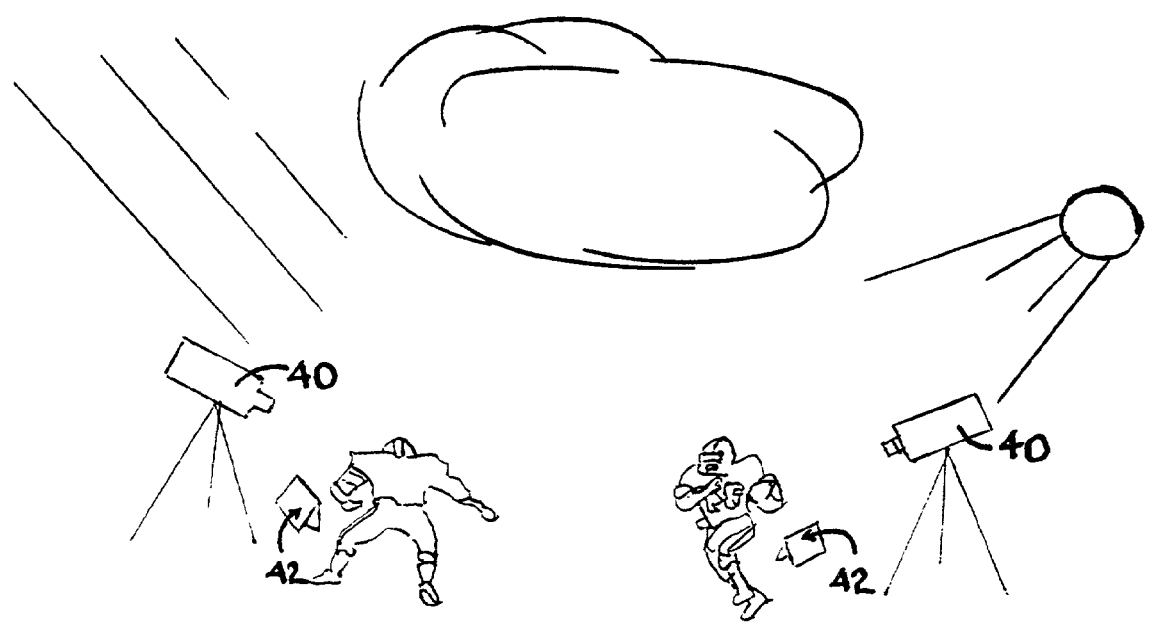
FIG. 6 is an illustration showing the use of multiple cameras at the same event shooting under different lighting conditions.
Figure 7:
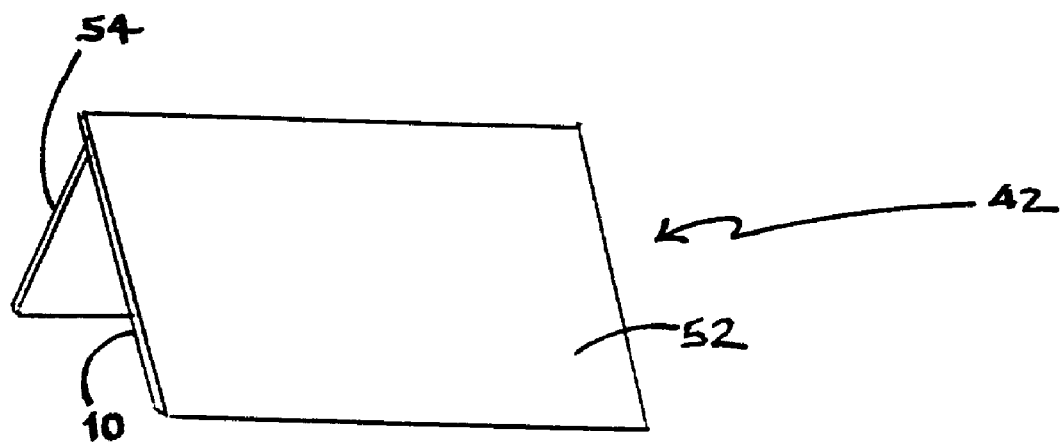
FIG. 7 is an illustration showing a preferred embodiment of this invention.

With the base sheet 8, after correction as shown in FIG. 2, being mounted to the backing sheet 10 and then laminated with lamination sheet 32, the device is complete for use. As shown in FIG. 7, the complete device, generally referred to by the numeral 42, will have a test surface 52. A support board 54 can be attached to the back side of the backing sheet 10 to permit support of the device in the field as shown in FIG. 6.

A multitude of reference devices, generally referred to by the numeral 42, all having the same calibration, can be used by different cameras 40 at different events to achieve a consistency in colour quality as between the cameras. This principle is illustrated in FIG. 6.

In closing, the inventor has provided a colour-biased or neutral white reference device for use with different cameras in different settings to achieve consistent colour quality and, as well, a method of consistently making the same. This represents a substantial advance in the art where precision is required.

Variations will be apparent to those skilled in the art without deviating from the scope of the invention. The scope of the invention is as defined in the appended claims.

I claim:

1. A method of producing a standardized white or colour-biased surface on reflective media for use with a camera with colour balance setting mechanisms, comprising: I) selecting a media with a surface that is suitable for modification to colorimetrically neutral reference surface; ii) analysing the spectral characteristics of the reference surface; treating the surface of the media with coloured droplets, with each of said droplets being less than 5 picoliters in volume to achieve the degree of desired white neutrality or colour bias.

2. A method as claimed in claim 1 wherein the surface of the media is laminated after its surface has been treated with coloured droplets.

3. A method as claimed in claim 1 wherein the coloured droplets are ink.

4. A method as claimed in claim 1 wherein the coloured droplets are pigment.

5. A reference device for setting the colour biasing mechanisms on a camera and achieving a consistent colour biasing in different environmental situations, comprising:
 a reflective media having a surface that has had its spectral characteristics analyzed and its surface treated with coloured droplets, wherein each of said droplets is less than 5 picoliters in volume, to achieve a degree of desired white neutrality or colour bias of different spectral quality than that which was analyzed as aforesaid.

6. A reference device as claimed in claim 5 wherein the surface of the media is laminated after its surface has been treated with coloured droplets.

7. A reference device as claimed in claim 5 wherein the coloured droplets are ink.

8. A reference device as claimed in claim 5 wherein the coloured droplets are pigment.

* * * * *